United States Patent
Dreyfoos et al.

(10) Patent No.: US 10,942,082 B2
(45) Date of Patent: Mar. 9, 2021

(54) WIRE BUNDLE FITTING TEST APPARATUS, SYSTEM AND METHOD THEREFOR

(71) Applicant: The Boeing Company, Chicago, IL (US)

(72) Inventors: Travis E. Dreyfoos, Woodinville, WA (US); Kane M. Mordaunt, Bellevue, WA (US); Robert Davis, Redmond, WA (US)

(73) Assignee: The Boeing Company, Chicago, IL (US)

( * ) Notice: Subject to any disclaimer, the term of this patent is extended or adjusted under 35 U.S.C. 154(b) by 216 days.

(21) Appl. No.: 16/047,564

(22) Filed: Jul. 27, 2018

(65) Prior Publication Data
US 2020/0033223 A1    Jan. 30, 2020

(51) Int. Cl.
| G01M 3/14 | (2006.01) |
|---|---|
| G01M 3/32 | (2006.01) |
| G01M 3/00 | (2006.01) |
| G01M 3/28 | (2006.01) |

(52) U.S. Cl.
CPC ............. G01M 3/14 (2013.01); G01M 3/007 (2013.01); G01M 3/2815 (2013.01); G01M 3/3236 (2013.01)

(58) Field of Classification Search
CPC ............................ G01M 3/14; G01M 3/2815
USPC ............ 73/40, 40.5 R, 40.7, 41.2, 45.7, 49.8
See application file for complete search history.

(56) References Cited

U.S. PATENT DOCUMENTS

| 2,694,924 | A | * | 11/1954 | Matlock et al. ..... | G01M 3/2869 73/37 |
|---|---|---|---|---|---|
| 3,043,129 | A | * | 7/1962 | King ...................... | G01M 3/04 73/40 |
| 3,326,035 | A | * | 6/1967 | Nobuyoshi ........... | G01M 3/146 73/40 |
| 3,426,580 | A | * | 2/1969 | Callahan, Jr. ....... | G01M 3/2853 73/40 |
| 4,244,209 | A | * | 1/1981 | Ceramicoli ........... | G01M 13/02 73/168 |
| 4,282,743 | A | * | 8/1981 | Pickett .................. | G01M 3/223 73/40.7 |
| 4,557,139 | A | * | 12/1985 | Cantwell ............... | G01M 3/223 73/40.7 |
| 5,345,813 | A | * | 9/1994 | Flessas ..................... | F16L 5/02 73/46 |
| 5,398,976 | A | * | 3/1995 | Webb ...................... | F16L 39/00 285/148.23 |
| 5,404,747 | A | * | 4/1995 | Johnston ................. | G01M 3/24 73/40 |
| 5,596,138 | A | * | 1/1997 | Onodera ................. | G01M 3/26 73/49.2 |
| 5,661,230 | A | * | 8/1997 | Morrison ............ | G01M 3/2861 73/46 |

(Continued)

*Primary Examiner* — John Fitzgerald
(74) *Attorney, Agent, or Firm* — Perman & Green LLP (57) ABSTRACT

A leak test apparatus including a sleeve member having a first end and a second end and being configured to surround a portion of a transmission medium, a first retaining device configured to couple the first end of the sleeve member to a boundary fitting to which the transmission medium is coupled, and where the sleeve member is configured to contain a leak detection medium and effect a pressurization of the boundary fitting with the leak detection medium.

20 Claims, 8 Drawing Sheets

(56) References Cited

U.S. PATENT DOCUMENTS

| | | | | |
|---|---|---|---|---|
| 5,979,227 | A * | 11/1999 | Lawson | G01M 3/042 340/605 |
| 6,029,505 | A * | 2/2000 | Webb | F16L 39/00 137/312 |
| 6,378,356 | B1 * | 4/2002 | Ruiz | G01M 3/022 73/37 |
| 6,615,642 | B2 * | 9/2003 | Poblete | G01M 3/2869 73/37 |
| 9,128,002 | B2 * | 9/2015 | Marino | G01M 3/226 |
| 9,322,737 | B2 * | 4/2016 | Holmberg | H01B 17/36 |
| 2004/0016290 | A1 * | 1/2004 | Poblete | G01M 3/32 73/46 |
| 2005/0284211 | A1 * | 12/2005 | Cram | G01M 3/14 73/40 |
| 2015/0219519 | A1 * | 8/2015 | Fetko | G01M 3/147 81/15.2 |

* cited by examiner

WIRE BUNDLE FITTING TEST APPARATUS, SYSTEM AND METHOD THEREFOR

BACKGROUND

1. Field

The exemplary embodiments generally relate to pass-through fittings and more particularly to apparatus and systems for testing the pass-through fittings for fluid leaks across the pass-through fittings.

2. Brief Description of Related Developments

Fluid tight connectors and/or suitable wire bundle fittings are used in vehicles to effect leak-less electrical connections, pipe connections, and/or wire bundle passage through a wall, bulkhead, or other pressure dividing/separating structure of a vehicle. Where the vehicle, such as an aircraft, is pressurized during use the connectors and wire bundle fittings are to be sealed to substantially prevent fluid (e.g., air) from passing through the connector or wire bundle fitting from higher pressure areas of the vehicle to lower pressure areas of the vehicle.

Generally, with respect to aircraft, the connectors and wire bundle fittings are pressure tested for fluid leakage by pressurizing an interior of the aircraft (e.g., a fuselage pressure test). The fuselage pressure test typically includes sealing off the aircraft and pressurizing the aircraft cabin. The fuselage pressure test may cause production scheduling delays, increase mechanic idle time, and may prevent other work from being performed on the aircraft while the fuselage pressure test is in progress. In some instances, the connectors and/or wire bundle fittings are installed underneath cabin floors, behind cabin structures (e.g., such as galleys), underneath seats, behind walls, and/or installed underneath or behind other interior furnishings, where the cabin floors, seats, walls, and other interior furnishings are installed prior to the fuselage pressure test. As such, reworking one or more of the connectors or wire bundle fittings in the event a leak is found includes disassembling respective floors/furnishings of the aircraft to gain access to the connector or wire bundle fitting and then reassembling the respective floors/furnishings of the aircraft. Disassembling and reassembling the respective floors/furnishings to rework the connectors and/or wire bundle fittings subjects the respective floors/furnishings to possible damage which may lead to further production delays and increased costs.

As an alternative to or in addition to the fuselage pressure test, the connectors and/or wire bundle fittings may be visually inspected for fluid tightness after installation according to predetermined visual inspection criteria. However, visual inspections of the connectors and/or wire bundle fittings are subject to inspector interpretation.

SUMMARY

Accordingly, apparatuses and methods, intended to address at least one or more of the above-identified concerns, would find utility.

The following is a non-exhaustive list of examples, which may or may not be claimed, of the subject matter according to the present disclosure.

One example of the subject matter according to the present disclosure relates to a leak test apparatus comprising: a sleeve member having a first end and a second end and being configured to surround a portion of a transmission medium; a first retaining device configured to couple the first end of the sleeve member to a boundary fitting to which the transmission medium is coupled; and wherein the sleeve member is configured to contain a leak detection medium and effect a pressurization of the boundary fitting with the leak detection medium.

Another example of the subject matter according to the present disclosure relates to a leak test apparatus comprising: a pressure vessel having a first end and a second end longitudinally spaced from the first end, the pressure vessel including a sleeve member configured to surround a portion of a transmission medium, a fluid flow restrictor configured to couple the sleeve member to the transmission medium adjacent the second end, and a first retaining device configured to couple the first end of the sleeve member to a boundary fitting to which the transmission medium is coupled; and wherein the pressure vessel is configured to contain a leak detection medium and effect a pressurization of the boundary fitting with the leak detection medium.

Still another example of the subject matter according to the present disclosure relates to a method for leak testing a boundary fitting, the method comprising: coupling a first end of a sleeve member to a boundary fitting with a first retaining device so that the sleeve member surrounds a portion of a transmission medium coupled to the boundary fitting; pressurizing the sleeve member with a leak detection medium; and detecting a presence or absence of the leak detection medium on a side of the boundary fitting that is opposite the sleeve member.

BRIEF DESCRIPTION OF THE DRAWINGS

Having thus described examples of the present disclosure in general terms, reference will now be made to the accompanying drawings, which are not necessarily drawn to scale, and wherein like reference characters designate the same or similar parts throughout the several views, and wherein:

DETAILED DESCRIPTION

Illustrative, non-exhaustive examples, which may or may not be claimed, of the subject matter according to the present disclosure are provided below.

Figure 1:
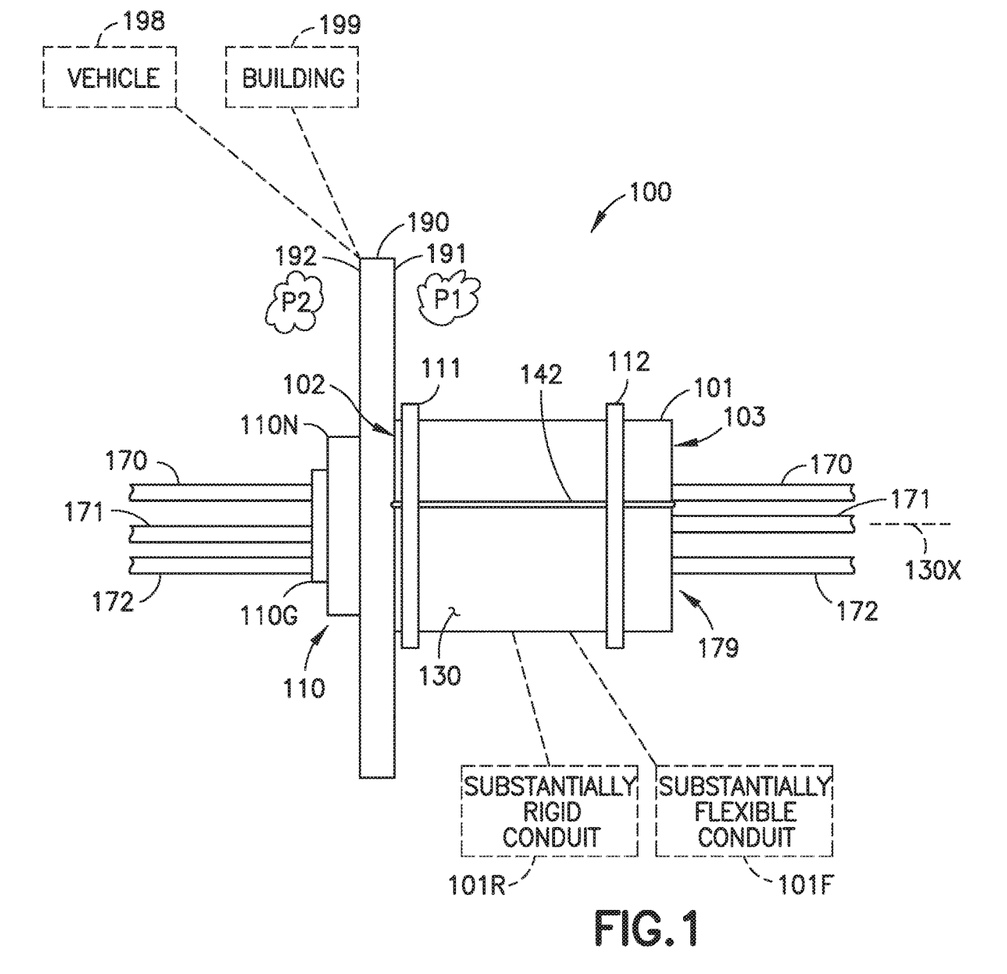
FIG. 1 is a schematic side view illustration of a leak test apparatus in accordance with aspects of the present disclosure.

Referring to FIG. 1, the aspects of the disclosed embodiment provide for a leak test apparatus 100 and method (FIG. 8) for leak testing suitable fluid tight couplings/pass-throughs, referred to herein as boundary fittings 110 (se also FIG. 9), substantially immediately after installation of the boundary fitting 110. The boundary fitting 110 provides for a sealed passage of one or more transmission medium 170, 171, 172 through a pressure boundary 190, where the transmission medium 170, 171, 172 is one or more of wires, pipes, or any other suitable medium through which fluid, communication signals, and/or electric current is passed. Examples of boundary fittings 110 include but are not limited to, e.g., electrical connectors/pass-throughs, pipe couplings/pass-throughs, and/or hose couplings/pass-throughs and/or wire bundle fittings. Suitable examples of boundary fittings 110 include the Deutsch® D-Easy series of cable and wire seals available from TE Connectivity Corporation or any suitable potted connector that employs a sealant around the wire bundles, pipes, and/or hoses.

The boundary fitting 110 may be installed on or through a boundary structure/wall (referred to herein as the pressure boundary 190) of any suitable vehicle 198 or building 199 that is subject to a differential pressure (e.g., different pressures on opposite sides of the boundary structure/wall) that would cause fluid flow through the boundary fitting 110 if it were not for the boundary fitting 110 being sealed. For example, pressure P1 may exist on a first side 191 of the pressure boundary 190 and pressure P2 may exist on a second side 192 of the pressure boundary 190, where pressure P1 is different than pressure P2 so as to create the pressure differential across the pressure boundary. Suitable examples of vehicles 198 in which the aspects of the present disclosure may be employed include aircraft, spacecraft, maritime vessels, submersibles, automotive vehicles and/or any other vehicle having a pressure boundary through which wires or pipes pass.

The aspects of the disclosed embodiments provide for leak testing of the boundary fitting 110 in hard to reach areas having limited access during vehicle 198 or building 199 assembly; or during maintenance of a completed vehicle 198 or building 199. The aspects of the disclosed embodiment also provide for rework of the boundary fitting 110 if a leak is found prior to any vehicle 198 or building 199 structure/furnishings being installed over or in front of the boundary fitting 110, which substantially reduces rework costs, reduces production delays, and/or prevents damage to the vehicle 198 or building 199 structure/furnishings as the rework of the boundary fitting 110 is performed prior to the installation of the structure/furnishings.

The aspects of the disclosed embodiment provide for an apparatus 100 that is easy to use without formal operational training. The apparatus 100 provides for inspection of the boundary fitting 110 by pressurizing the boundary fitting 110 and visually detecting leaks, which may substantially eliminates any interpretation of inspection criteria. For example, the apparatus 100 provides for a simple pass/fail criteria for leak detection across the boundary fitting 110 where the leak is detected directly using a leak detection medium 250 (see e.g., FIGS. 2, 3, and 4). The aspects of the disclosed embodiment may also provide for leak detection for individual boundary fittings 110 and identify a specific portion of the boundary fitting 110 that is leaking.

Figure 5A:
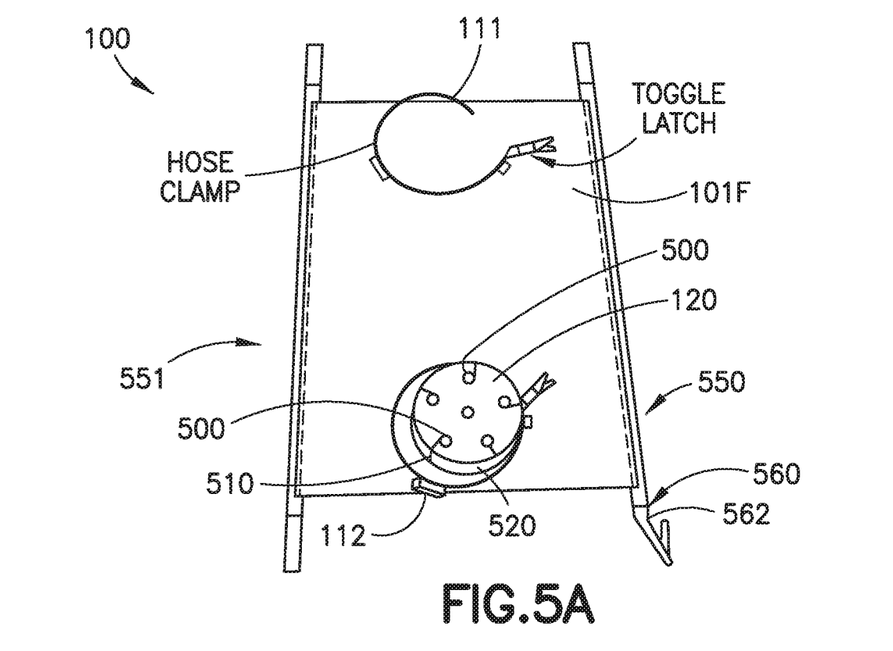
FIG. 5A is an exemplary illustration of the leak test apparatus of FIG. 1 in an unassembled configuration in accordance with aspects of the present disclosure.
Figure 5B:
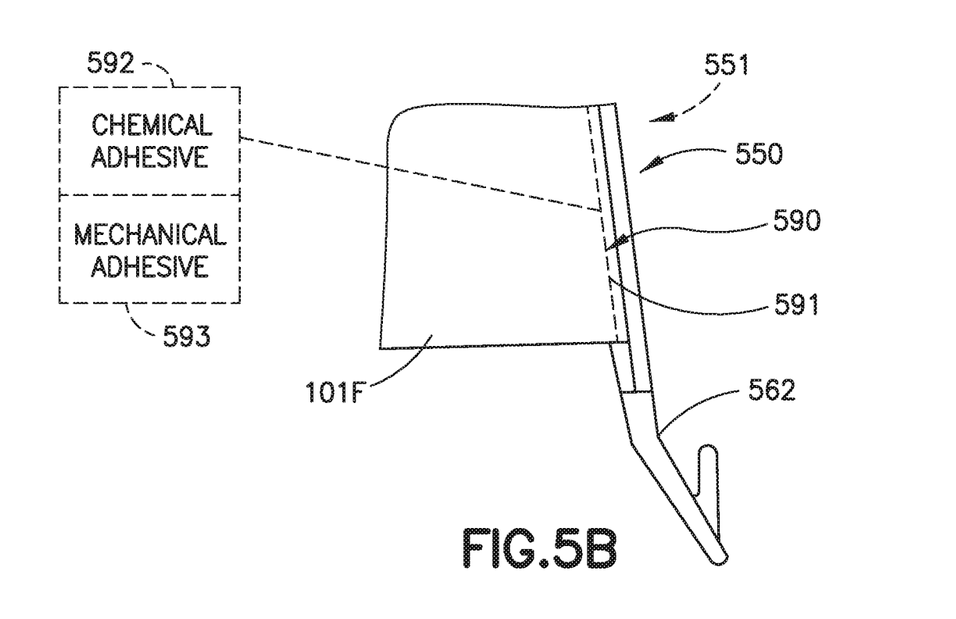
FIG. 5B is an illustration of the leak test apparatus of FIG. 5A accordance with aspects of the present disclosure.
Figure 5C:
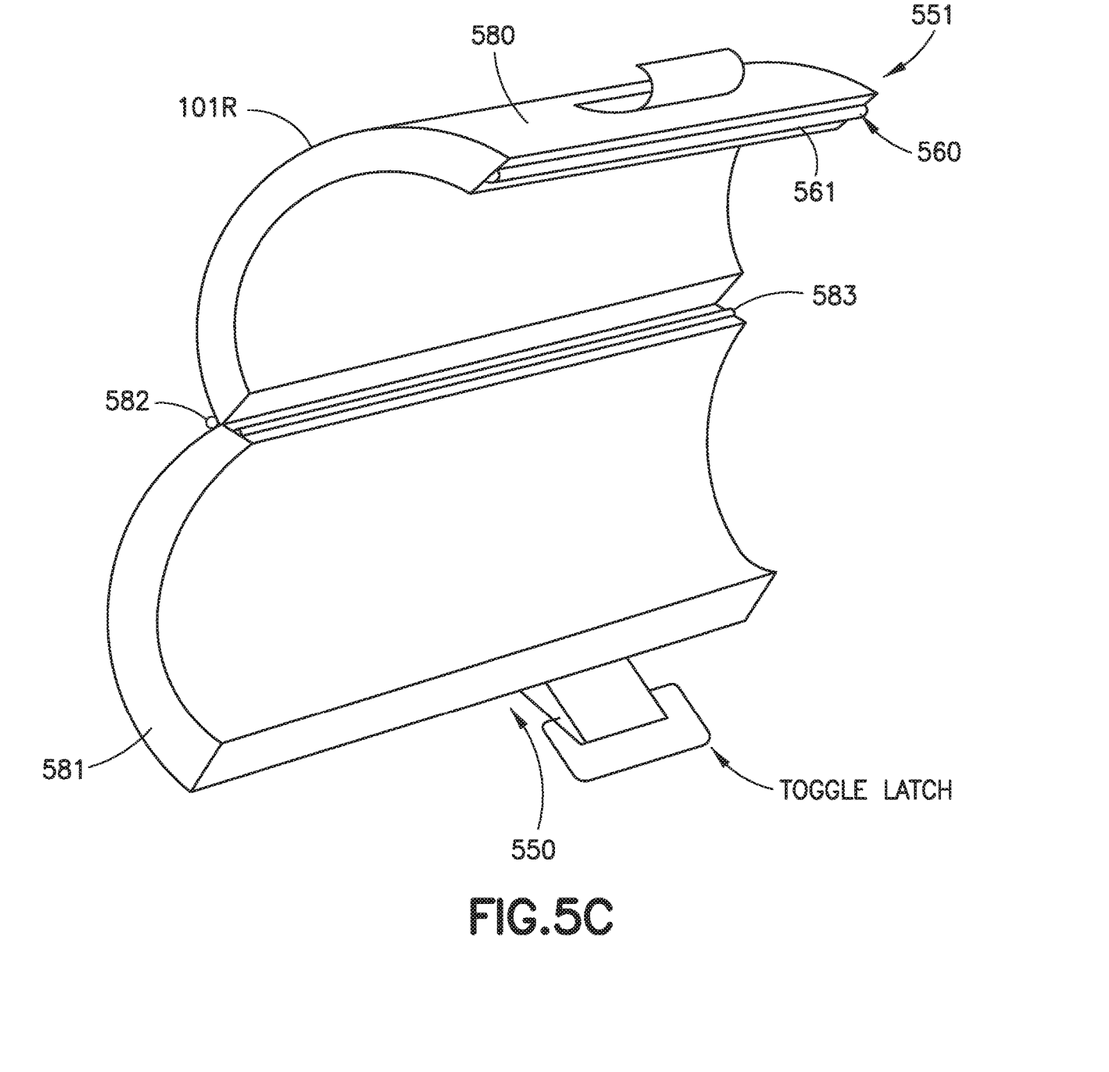
FIG. 5C is an exemplary illustration of a portion of the leak test apparatus of FIG. 1 in an unassembled configuration in accordance with aspects of the present disclosure.

Still referring to FIG. 1, the leak test apparatus 100 includes a sleeve member 101 and a first retaining device 111. The sleeve member 101 has a first end 102 and a second end 103, longitudinally spaced from the first end 102, and is configured to surround a portion 179 of the transmission medium 170, 171, 172. Referring also to FIGS. 5A, 5B, and 5C, the sleeve member 101 includes a body 130 having a longitudinal axis 130X extending between the first end 102 and the second end 103. The sleeve member 101 includes longitudinally extending edges 550, 551 of the body 130 that extend along the longitudinal axis 130X and form a seam 142 through which the transmission medium 170, 171, 172 is inserted into the sleeve member 101. The sleeve member 101 includes a seal 560 extending along the seam 142 and being configured to couple the longitudinally extending edges 550, 551. In one aspect, the seal 560 may be a resilient member 561 that extends along the seam 142 and is compressed by the longitudinally extending edges 550, 551. In another aspect, the seal 560 comprises a fluid-tight zipper 562. The seal 560 may be configured to separate from the sleeve member 101 upon, for example, an over-pressurization of the sleeve member 101 so that leak detection medium 250 within the sleeve member is released in a controlled manner. Where the seal 560 comprises a resilient member 561 the resilient member 561 may be constructed of a frangible material that allows leakage at a predetermined pressure. Where the seal 560 comprises the fluid-tight zipper 562, the fluid-tight zipper 562 is coupled to the body 130 with a frangible coupling 590 (FIG. 5B). The frangible coupling 590 comprises one or more of a single line of stitching 591, a chemical adhesive 592 (e.g., such as a glue), and a mechanical adhesive 593 (e.g., such as a hook and loop fastener).

In one aspect, the sleeve member 101 may be a substantially rigid conduit 101R, such as for example, formed of a rigid pipe as illustrated in FIG. 5C. The substantially rigid conduit 101R may be bifurcated into a first portion 580 and a second portion 581 so as to form a clam shell. For example, the first portion 580 and second portion 581 are coupled to each other with any suitable hinge 582 so that the longitudinally extending edges 550, 551 can pivot towards and away from each other to open and close the substantially rigid conduit 101R for the insertion and removal of the transmission medium 170, 171, 172. A seal 583 may be provided adjacent the hinge to further seal substantially rigid conduit 101R. In other aspects, the sleeve member 101 may be a substantially flexible conduit 101F, such as for example, a formed of a flexible tube or fabric as illustrated in FIG. 5A. The flexible conduit 101F may be wrapped around the transmission medium 170, 171, 172 and the longitudinally extending edges 550, 551 may be coupled in any suitable manner such as described herein.

Referring again to FIG. 1, the first retaining device 111 is configured to couple the first end 102 of the sleeve member 101 to the boundary fitting 110 to which the transmission medium 170, 171, 172 is coupled. For example, referring also to FIG. 9, the boundary fitting 110 includes a housing 110H that extends through the pressure boundary 190, a grommet 110G that is disposed within the housing 110H and couples with the transmission medium 170, 171, 172, and nuts 110N that couples with and retain the housing 110H on the pressure boundary 190. The sleeve member 101 circumferentially surrounds at least the nut 110N and is compressed against the nut 110N by the first retaining device 111 (see, e.g., FIG. 2) so as to form at least a partial seal between the sleeve member 101 and the boundary fitting 110. As described herein, the sleeve member 101 is configured to contain a leak detection medium 250 (see FIGS. 2, 3 and 4) and effect a pressurization of the boundary fitting 110 with the leak detection medium 250.

Figure 6A:
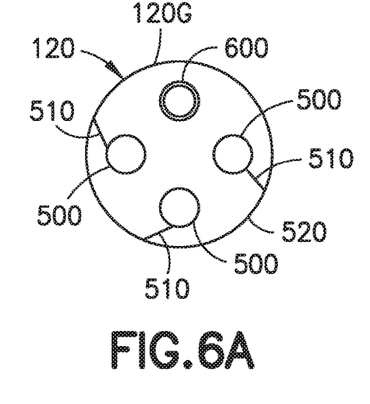
FIG. 6A is a front view of a portion of the leak test apparatus of FIG. 1 in accordance with aspects of the present disclosure.
Figure 7A:
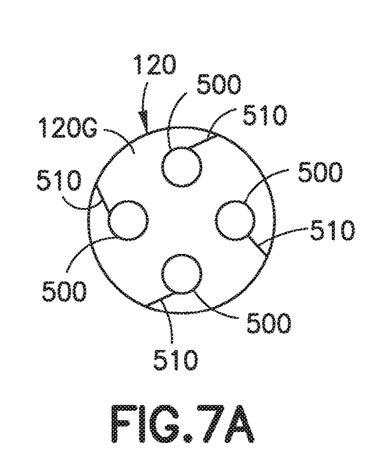
FIG. 7A is a front view of a portion of the leak test apparatus of FIG. 1 in accordance with aspects of the present disclosure.

In one aspect, referring to FIGS. 1-4, the leak test apparatus 100 includes a fluid flow restrictor 120 disposed adjacent the second end 103 of the sleeve member 101. The fluid flow restrictor 120 is a grommet 120G (see FIGS. 6A and 7A) or other suitable restrictor configured to couple with the transmission medium 170, 171, 172 to at least restrict (e.g., form a partial seal) leak detection medium 250 egress from the second end 103 of the sleeve member 101. Referring also to FIGS. 5A, 6A, 7A, the fluid flow restrictor 120 comprises a resiliently compressible material, e.g., foam, rubber, etc., having one or more apertures 500 extending therethrough. A respective slot 510 extends from a peripheral side edge 520 of the fluid flow restrictor 120 to a respective aperture 500. The slot 510 provide for passage of the transmission medium 170, 171, 172 through the peripheral side edge 520 to the respective aperture 500 so that the transmission medium 170, 171, 172 can be placed within and extend through the respective aperture without having to cut or disassemble the transmission medium 170, 171, 172.

Referring again to FIGS. 1-4, a second retaining device 112 is configured to couple the fluid flow restrictor 120 to both the sleeve member 101 and the transmission medium 170, 171, 172, so that the sleeve member 101, with at least the fluid flow restrictor 120, forms a pressure vessel 200 between the boundary fitting 110 and the fluid flow restrictor 120. For example, the second retaining device 112 may circumferentially extend around the sleeve member 101 so as to compress the sleeve member 101 against the fluid flow restrictor 120. The second retaining device 112 also compresses the fluid flow restrictor against the transmission medium 170, 171, 172 to at least restrict the leak detection medium 250 egress from the second end 103 of the sleeve member 101. Where the sleeve member 101 is formed of as the substantially rigid conduit 101R the first retaining device 111 and the second retaining device 112 may be integrated with the substantially rigid conduit (e.g., such as a toggle latch that extends across a seam 142 of the sleeve member 101—see FIG. 5C) and may extend only partially around the circumference of the sleeve member 101. In other aspects, the first retaining device 111 and the second retaining device 112 may be in the form of a hose clamp (see FIG. 5A, noting that the exemplary hose clamp shown incorporates a toggle latch) or other suitable retainer (e.g., resilient band, rope, wire, etc.) that circumferentially extends around the sleeve member 101 for compressing at least the sleeve member 101 in a radially inward direction. In other aspects, the first retaining device 111 and/or the second retaining device 112 may be integral to the sleeve member 101 in any suitable manner.

Figure 6B:
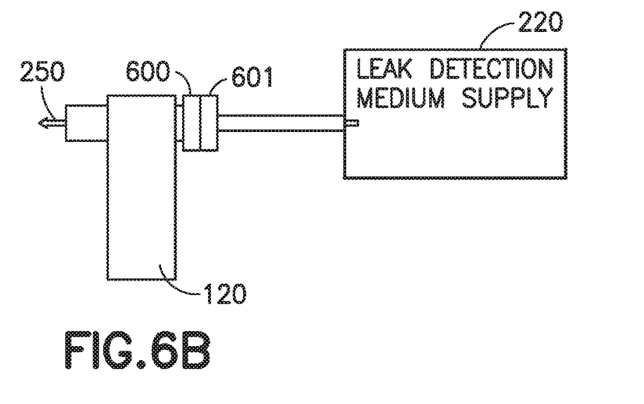
FIG. 6B is a side view of a portion of the leak test apparatus of FIG. 1 in accordance with aspects of the present disclosure.
Figure 7B:
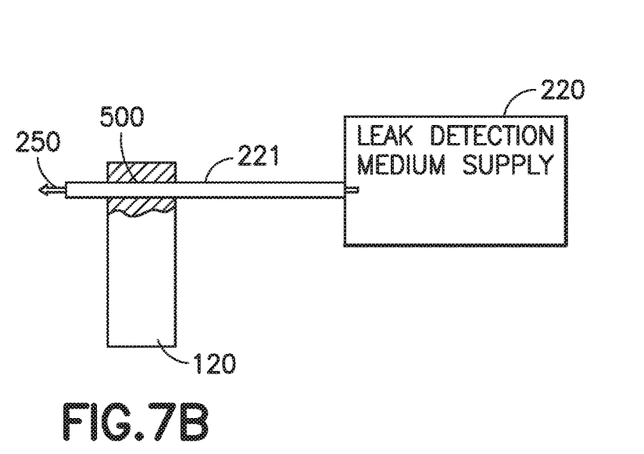
FIG. 7B is a side view of a portion of the leak test apparatus of FIG. 1 in accordance with aspects of the present disclosure.

Referring to FIGS. 2, 3, 4, 6B, and 7B, the leak test apparatus 100 may also include a leak detection medium supply 220 configured to, in some aspects, couple with and pressurize the sleeve member 101. For example, a fluid conduit 221 may extend between the leak detection medium supply 220 and the sleeve member 101. In one aspect, as shown in FIG. 7B, the fluid conduit 221 is inserted through an aperture 500 of the fluid flow restrictor 120 and held within the aperture 500 by the compressive force provided by the second retaining device 112. In other aspects, as shown in FIG. 6B, the fluid flow restrictor 120 includes a coupling member 600 that is configured to releasably couple with a mating coupling member 601 of the fluid conduit 221.

Figure 2:
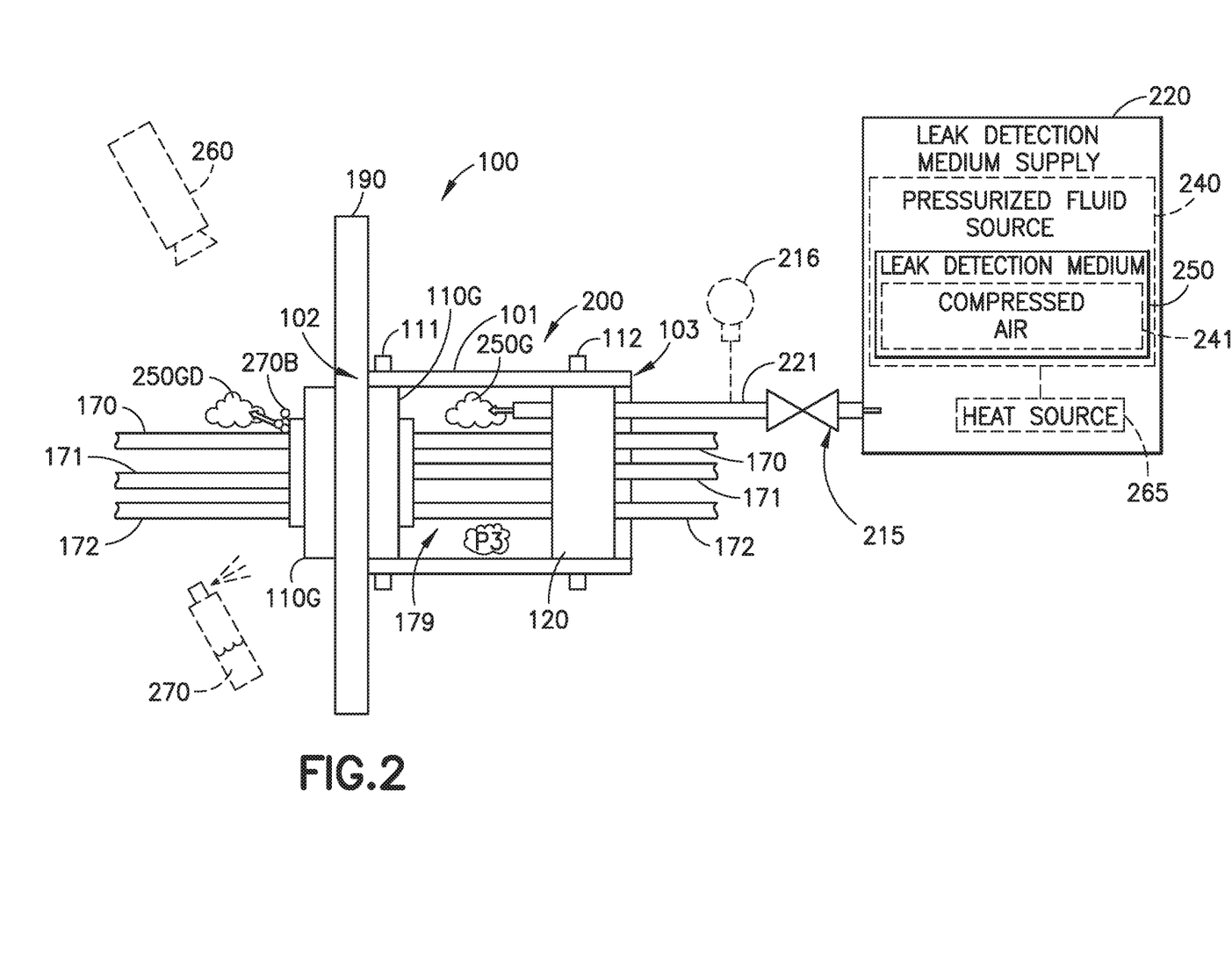
FIG. 2 is a schematic cross sectional illustration of the leak test apparatus of FIG. 1 in accordance with aspects of the present disclosure.

The leak detection medium 250 stored or generated by the leak detection supply includes one or more of liquid 250L leak detection medium 250 (see FIGS. 3 and 4) and a gas 250GD leak detection medium (see FIG. 2). In one aspect, referring to FIG. 2, the leak detection medium supply 220 comprises a pressurized fluid source 240 where the gas 250GD within the pressurized fluid source 240 is compressed air 241. In one aspect, the leak detection medium 250, in the gas 250GD form, is a visible gas that is visible in one or more of a visible spectrum and an infrared spectrum. Where the gas 250GD is visible in the infrared spectrum an infrared detector 260 may be provided to detect, for example, a heat signature of the gas 250GD. To heat the gas 250GD so that the gas is visible in the infrared spectrum, the leak detection medium supply includes a heat source 265. Where the gas 250GD is visible in the visible spectrum the gas 250GD is one or more of a smoke, steam, or any other gas mixture that is visible to, for example, the human eye. In another aspect, the leak detection medium 250, in the gas 250GD form, is an invisible gas where the leak detection medium further includes a liquid and soap solution 270 configured to interact with the invisible gas and provide a visual indication of a leak at an interface between, for example, the compressed air 241 (forming the invisible gas) and the liquid and soap solution 270. Where the leak detection medium 250 is a liquid 250L, the leak detection medium supply 220 comprises a liquid container 300 (see FIGS. 3 and 4) for holding the liquid 250L.

Figure 3:
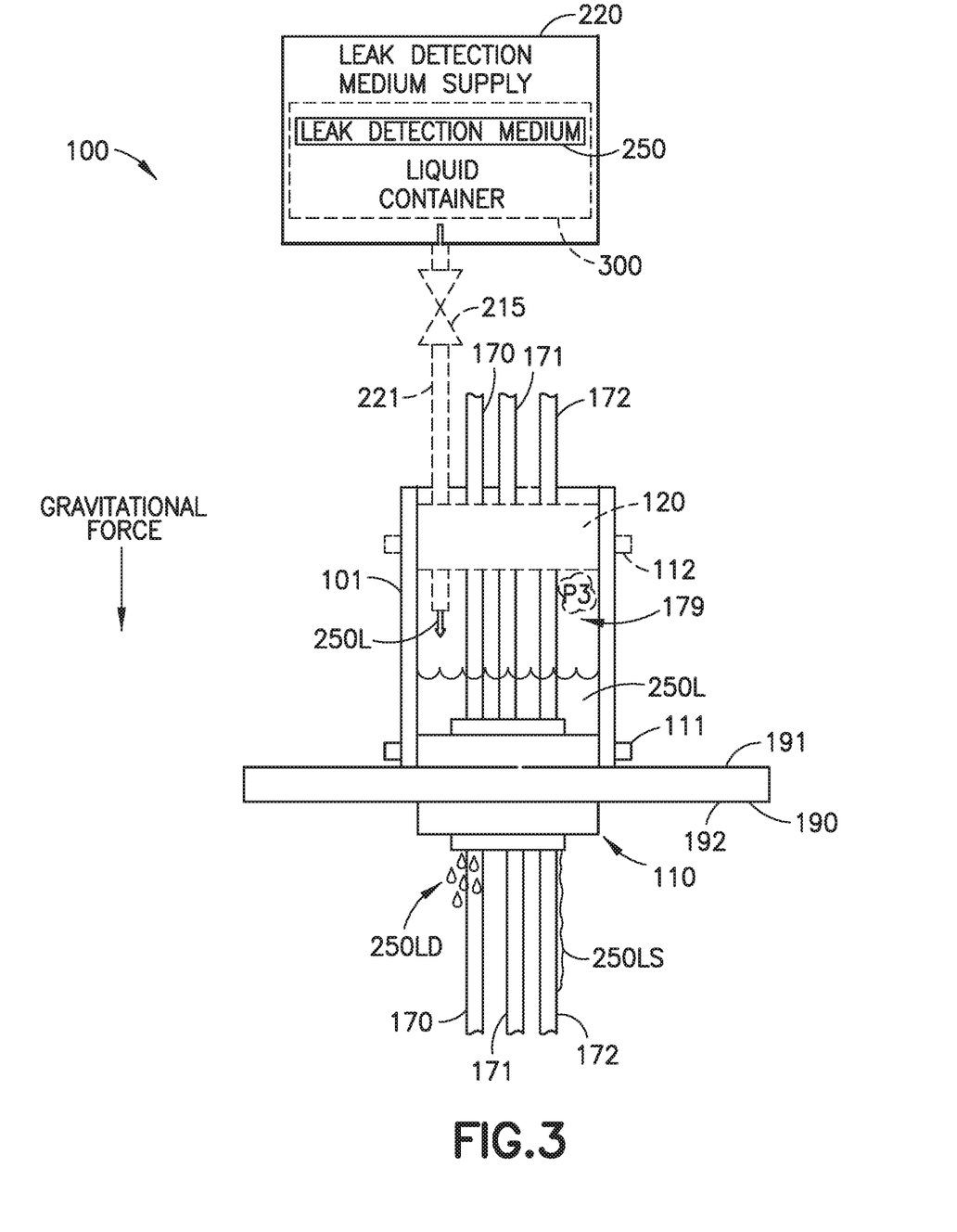
FIG. 3 is a schematic cross sectional illustration of the leak test apparatus of FIG. 1 in accordance with aspects of the present disclosure.
Figure 4:
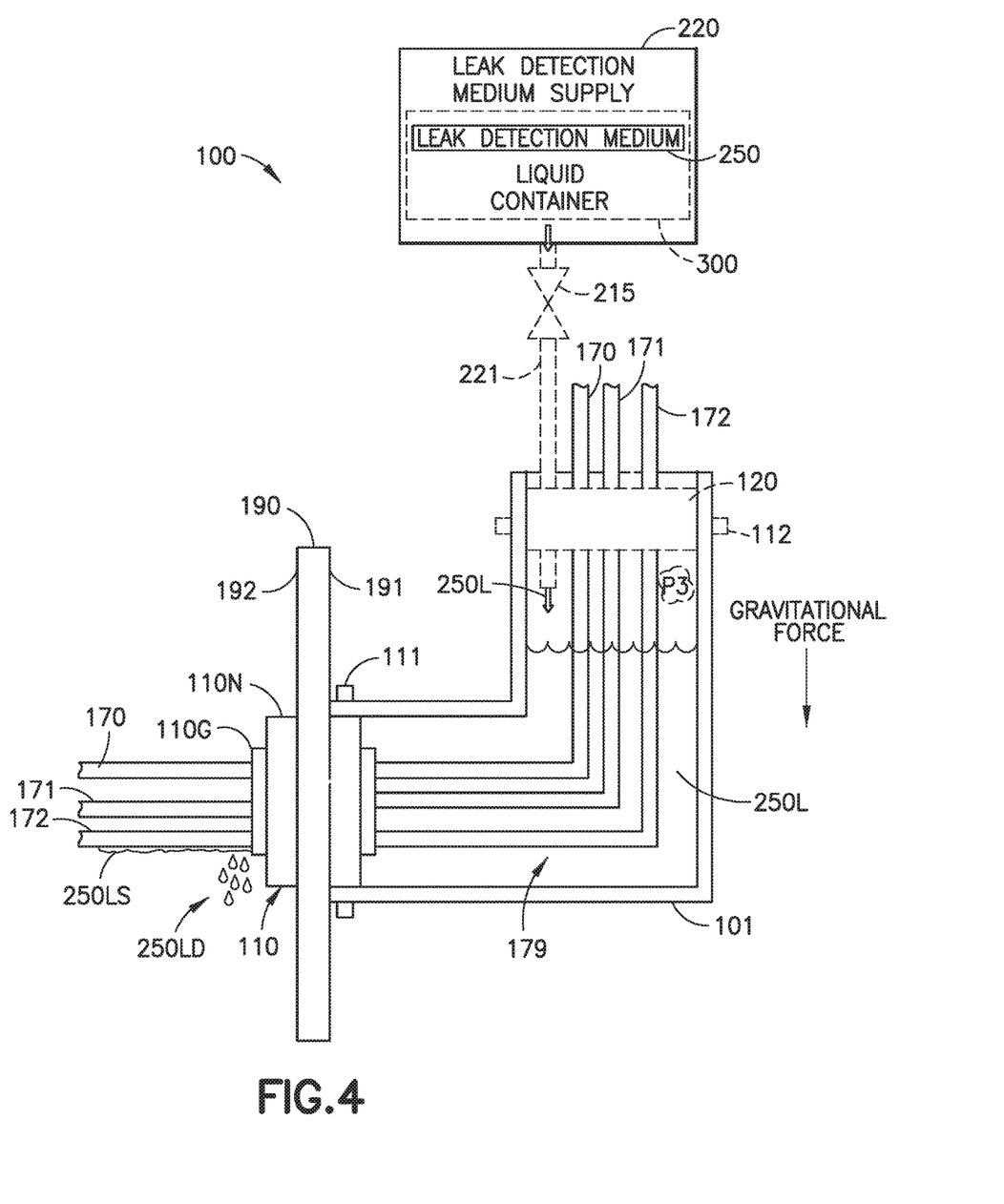
FIG. 4 is a schematic cross sectional illustration of the leak test apparatus of FIG. 1 in accordance with aspects of the present disclosure.

Referring to FIGS. 2, 3, and 4, the leak detection medium 250 may be fed into the pressure vessel 200 so that the sleeve member 101 is pressurized to a pressure P3 of greater than about 0 psi to about 12 psi or to a pressure greater than about 0 psi to about 2 psi. The pressure to which the pressure vessel 200, formed by sleeve member 101, is pressurized is such that any leak detection medium 250 that migrates through the boundary fitting 110 has a flow rate that does not obscure detection of the leak detection medium 250. In other aspects, such as where the leak detection medium 250 is a gravity fed liquid 250L (see FIGS. 3 and 4) the sleeve member 101 may be open to atmospheric pressure such that the sleeve member 101 pressurizes the boundary fitting 110 through containment of the water column (e.g., about 6 inches of water column or more or less than about 6 inches of water column) above or against the boundary fitting 110. Where the sleeve member 101 is open to atmosphere the leak detection medium supply may be configured for pouring the liquid 250L leak detection medium 250 into the sleeve member 101. While the leak test apparatus 100 is illustrated in FIG. 3 as having a substantially vertical orientation, it should be understood that the leak test apparatus 100, when employed with a liquid 250L leak detection medium 250 may have any suitable orientation as long as the gravitational force and/or liquid level/pressure (e.g., maintained at least in part with the fluid flow restrictor 120) within the sleeve member 101 is able to maintain pressurization of the boundary fitting 110 with the liquid 250L Any suitable valve 215 may be provided with the fluid conduit 221 for controlling a flow of leak detection medium 250 from the leak detection medium supply 220. Any suitable pressure gauge 216 may be provided with the fluid conduit 221 for measuring a pressure of leak detection medium 250 within the sleeve member 101.

As noted above, the sleeve member 101 may only be partially sealed such that there may be some leakage of the leak detection medium 250 from the sleeve member 101. This leakage of leak detection medium from the sleeve member 101 may not affect the detection of leaks through the boundary fitting 110 as long as sufficient pressure (as noted above) is maintained against the boundary fitting so that if there is a leak in the boundary fitting 110 the leak detection medium migrates through the boundary fitting 110 along a path of the leak.

Figures 8, 9:
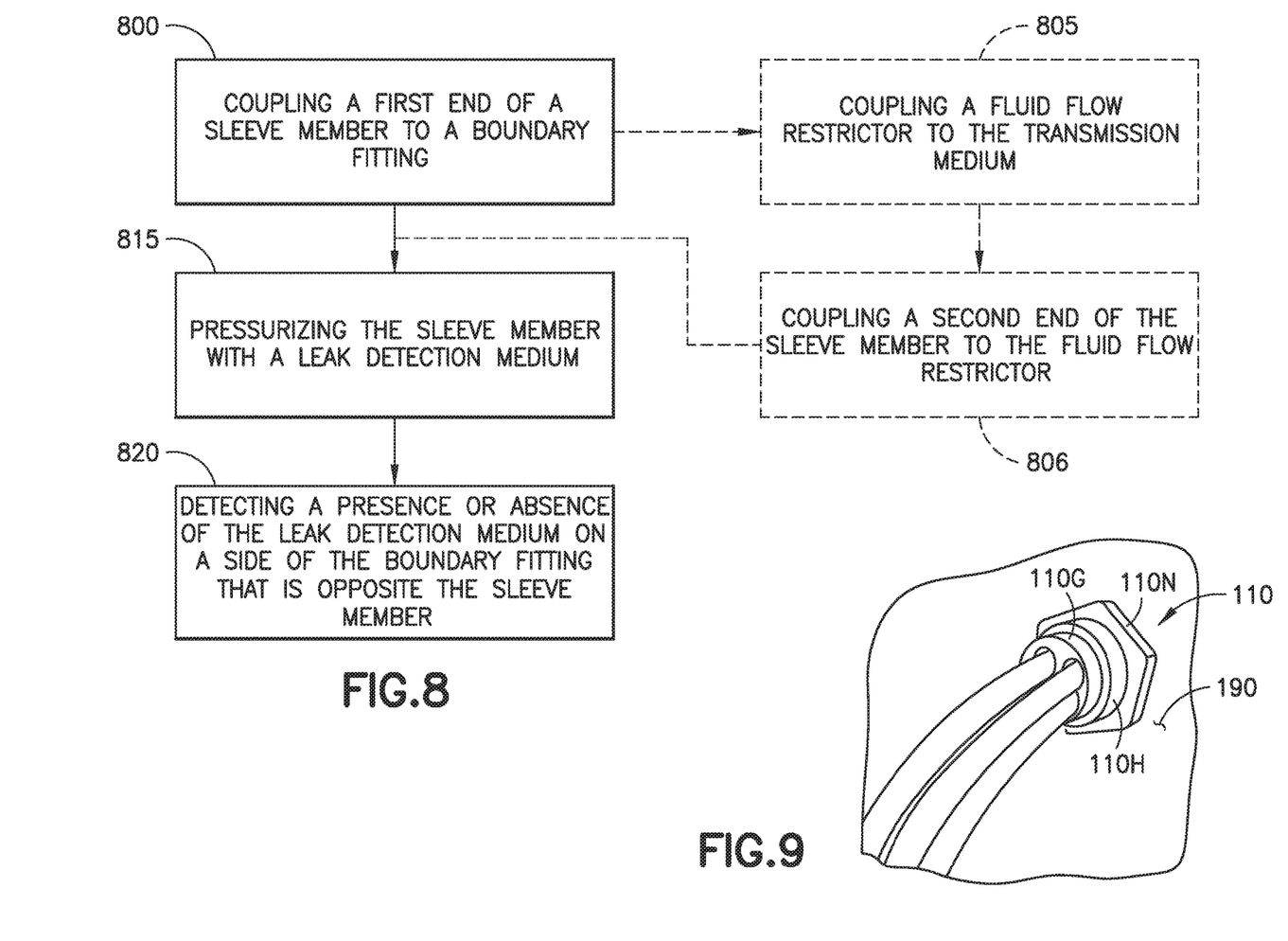
FIG. 8 is an flow diagram of an exemplary method for leak testing with the leak test apparatus of FIG. 1 in accordance with aspects of the present disclosure.
FIG. 9 is an exemplary illustration of a portion of boundary fitting in accordance with aspects of the present disclosure.

Referring to FIGS. 1, 2, 3, 4, and 8, a method for leak testing a boundary fitting 110 will be described. The method includes coupling the first end 102 of the sleeve member 101 to the boundary fitting 110 (FIG. 8, Block 800) with the first retaining device 111 so that the sleeve member 101 surrounds the portion 179 of the transmission medium 170, 171, 172 coupled to the boundary fitting 110. Where the sleeve member 101 is not open to the atmosphere, the method includes coupling the fluid flow restrictor 120 to the transmission medium 170, 171, 172 (FIG. 8, Block 805) and coupling the second end 103 of the sleeve member 101 to the fluid flow restrictor 120 with the second retaining device 112. The sleeve member 101 is pressurized with the leak detection medium 250 (FIG. 8, Block 815). Pressurizing the sleeve member includes one or more of filling the sleeve member 101 with the leak detection medium 250 in a form of a liquid 250L and a gas 250GD. In one aspect the sleeve member is pressurized to a pressure of greater than about 0 psi to about 12 psi, and in another aspect the sleeve member is pressurized to a pressure greater than about 0 psi to about 2 psi.

A presence or absence of the leak detection medium 250 is detected on the side of the boundary fitting 110 that is opposite the sleeve member 101 (FIG. 8, Block 820), which in the example shown in FIG. 1, is the portion of the boundary fitting extending from the second side 192 of the pressure boundary 190. In one aspect, such as where the leak detection medium is the invisible gas detecting the presence or absence of the leak detection medium 250 includes applying the liquid and soap solution 270 to the side of the boundary fitting 110 that is opposite the sleeve member 101 and detecting a presence of bubbles 270B (FIG. 2) formed by an interaction between the liquid and soap solution 270 and the leak detection medium 250. Where the leak detection medium 250, in the gas 250GD form (infrared signatures may also apply to the leak detection medium 250 in the liquid form 250L), has an infrared signature detecting the presence or absence of the leak detection medium 250 includes detecting the presence of the leak detection medium 250 flowing through the boundary fitting 110 in the infrared spectrum, such as with the infrared detector 260 (FIG. 2). Where the leak detection medium 250, in the gas 250GD form, is visible to the human eye detecting the presence or absence of the leak detection medium 250 includes detecting the presence of the leak detection medium flowing through the boundary fitting 110 in the visible spectrum. Where the leak detection medium 250 is in a liquid form 250L detecting the presence or absence of the leak detection medium 250 includes detecting the presence of the leak detection medium 250 flowing through the boundary fitting 110 in a liquid form 250L, such as in the form of liquid droplets 250LD (FIGS. 3 and 4) or in the form of a liquid stream 250LS (FIGS. 3 and 4).

The following examples are provided in accordance with the aspects of the present disclosure:

A1. A leak test apparatus comprising:
a sleeve member having a first end and a second end and being configured to surround a portion of a transmission medium;
a first retaining device configured to couple the first end of the sleeve member to a boundary fitting to which the transmission medium is coupled; and
wherein the sleeve member is configured to contain a leak detection medium and effect a pressurization of the boundary fitting with the leak detection medium.

A2. The leak test apparatus of paragraph A1, further comprising a leak detection medium supply configured to couple with and pressurize the sleeve member.

A3. The leak test apparatus of paragraph A2, wherein the leak detection medium supply comprises a pressurized fluid source.

A4. The leak test apparatus of paragraph A3, wherein the pressurized fluid source comprises compressed air.

A5. The leak test apparatus of paragraph A4, wherein the leak detection medium further comprises a liquid and soap solution configured to provide a visual indication of a leak at an interface between the compressed air and the liquid and soap solution.

A6. The leak test apparatus of paragraph A2, wherein the leak detection medium supply comprises a heat source.

A7. The leak test apparatus of paragraph A2, wherein the leak detection medium supply comprises a liquid container.

A8. The leak test apparatus of paragraph A1, further comprising a fluid flow restrictor disposed adjacent the second end of the sleeve member, the fluid flow restrictor being configured to couple with the transmission medium to at least restrict leak detection medium egress from the second end of the sleeve member.

A9. The leak test apparatus of paragraph A8, further comprising a second retaining device configured to couple the fluid flow restrictor to both the sleeve member and the transmission medium so that the sleeve member forms a pressure vessel between the boundary fitting and the fluid flow restrictor.

A10. The leak test apparatus of paragraph A8, further comprising a leak detection medium supply configured to couple with the fluid flow restrictor to effect pressurization of the sleeve member.

A11. The leak test apparatus of paragraph A8, wherein the fluid flow restrictor includes a coupling member configured to couple with a leak detection medium supply.

A12. The leak test apparatus of paragraph A8, wherein the fluid flow restrictor comprises a grommet.

A13. The leak test apparatus of paragraph A1, wherein the sleeve member comprises a substantially rigid conduit.

A14. The leak test apparatus of paragraph A1, wherein the sleeve member comprises a substantially flexible conduit.

A15. The leak test apparatus of paragraph A1, wherein the sleeve member comprises:
a body having a longitudinal axis extending between the first end and the second end;
longitudinally extending edges of the body that extend along the longitudinal axis and form a seam through which the transmission medium is inserted into the sleeve member; and
a seal extending along the seam and being configured to couple the longitudinally extending edges.

A16. The leak test apparatus of paragraph A15, wherein the seal comprises a fluid-tight zipper.

A17. The leak test apparatus of paragraph A16, wherein the fluid-tight zipper is coupled to the body with a frangible coupling.

A18. The leak test apparatus of paragraph A17, wherein the frangible coupling comprises a single line of stitching.

A19. The leak test apparatus of paragraph A17, wherein the frangible coupling comprises one or more of a chemical adhesive and a mechanical adhesive.

A20. The leak test apparatus of paragraph A1, wherein the leak detection medium comprises one or more of liquid and a gas.

A21. The leak test apparatus of paragraph A1, wherein the leak detection medium comprises a visible gas.

A22. The leak test apparatus of paragraph A21, wherein the visible gas is visible in a visible spectrum.

A23. The leak test apparatus of paragraph A21, wherein the visible gas is visible in an infrared spectrum.

A24. The leak test apparatus of paragraph A23, further comprising an infrared detector.

B1. A leak test apparatus comprising:
a pressure vessel having a first end and a second end longitudinally spaced from the first end, the pressure vessel including
a sleeve member configured to surround a portion of a transmission medium,
a fluid flow restrictor configured to couple the sleeve member to the transmission medium adjacent the second end, and
a first retaining device configured to couple the first end of the sleeve member to a boundary fitting to which the transmission medium is coupled; and
wherein the pressure vessel is configured to contain a leak detection medium and effect a pressurization of the boundary fitting with the leak detection medium.

B2. The leak test apparatus of paragraph B1, further comprising a second retaining device configured to couple the sleeve member to the fluid flow restrictor.

B3. The leak test apparatus of paragraph B1, further comprising a leak detection medium supply configured to couple with and pressurize the sleeve member.

B4. The leak test apparatus of paragraph B3, wherein the leak detection medium supply comprises a pressurized fluid source.

B5. The leak test apparatus of paragraph B4, wherein the pressurized fluid source comprises compressed air.

B6. The leak test apparatus of paragraph B5, wherein the leak detection medium further comprises a liquid and soap solution configured to provide a visual indication of a leak at an interface between the compressed air and the liquid and soap solution.

B7. The leak test apparatus of paragraph B4, wherein the leak detection medium supply comprises a heat source.

B8. The leak test apparatus of paragraph B4, wherein the leak detection medium supply comprises a liquid container.

B9. The leak test apparatus of paragraph B1, wherein the fluid flow restrictor is configured to couple with the transmission medium to at least restrict leak detection medium egress from a second end of the sleeve member.

B10. The leak test apparatus of paragraph B9, wherein the sleeve member forms, at least in part, a pressure vessel between the boundary fitting and the fluid flow restrictor.

B11. The leak test apparatus of paragraph B9, further comprising a leak detection medium supply configured to couple with the fluid flow restrictor to effect pressurization of the sleeve member.

B12. The leak test apparatus of paragraph B9, wherein the fluid flow restrictor includes a coupling member configured to couple with a leak detection medium supply.

B13. The leak test apparatus of paragraph B9, wherein the fluid flow restrictor comprises a grommet.

B14. The leak test apparatus of paragraph B1, wherein the sleeve member comprises a substantially rigid conduit.

B15. The leak test apparatus of paragraph B1, wherein the sleeve member comprises a substantially flexible conduit.

B16. The leak test apparatus of paragraph B1, wherein the sleeve member comprises:
a body having a longitudinal axis extending between the first end and a second end;
longitudinally extending edges of the body that extend along the longitudinal axis and form a seam through which the transmission medium is inserted into the sleeve member; and
a seal extending along the seam and being configured to couple the longitudinally extending edges.

B17. The leak test apparatus of paragraph B16, wherein the seal comprises a fluid-tight zipper.

B18. The leak test apparatus of paragraph B16, wherein the fluid-tight zipper is coupled to the body with a frangible coupling.

B19. The leak test apparatus of paragraph B18, wherein the frangible coupling comprises a single line of stitching.

B20. The leak test apparatus of paragraph B18, wherein the frangible coupling comprises one or more of a chemical adhesive and a mechanical adhesive.

B21. The leak test apparatus of paragraph B1, wherein the leak detection medium comprises one or more of liquid and a gas.

B22. The leak test apparatus of paragraph B1, wherein the leak detection medium comprises a visible gas.

B23. The leak test apparatus of paragraph B22, wherein the visible gas is visible in a visible spectrum.

B24. The leak test apparatus of paragraph B22, wherein the visible gas is visible in an infrared spectrum.

B25. The leak test apparatus of paragraph B24, further comprising an infrared detector.

C1. A method for leak testing a boundary fitting, the method comprising:
coupling a first end of a sleeve member to a boundary fitting with a first retaining device so that the sleeve member surrounds a portion of a transmission medium coupled to the boundary fitting;
pressurizing the sleeve member with a leak detection medium; and
detecting a presence or absence of the leak detection medium on a side of the boundary fitting that is opposite the sleeve member.

C2. The method of paragraph C1, wherein pressurizing the sleeve member comprises filling the sleeve member with the leak detection medium in a form of a liquid.

C3. The method of paragraph C1, wherein pressurizing the sleeve member comprises filling the sleeve member with the leak detection medium in a form of a gas.

C4. The method of paragraph C1, further comprising:
coupling a fluid flow restrictor to the transmission medium; and
coupling a second end of the sleeve member to the fluid flow restrictor with a second retaining device.

C5. The method of paragraph C1, wherein detecting the presence or absence of the leak detection medium on the side of the boundary fitting that is opposite the sleeve member comprises:

applying a liquid soap solution to the side of the boundary fitting that is opposite the sleeve member; and detecting a presence of bubbles formed by an interaction between the liquid soap solution and the leak detection medium.

C6. The method of paragraph C1, wherein detecting the presence or absence of the leak detection medium on the side of the boundary fitting that is opposite the sleeve member comprises detecting the presence of the leak detection medium flowing through the boundary fitting in an infrared spectrum.

C7. The method of paragraph C1, wherein detecting the presence or absence of the leak detection medium on the side of the boundary fitting that is opposite the sleeve member comprises detecting the presence of the leak detection medium flowing through the boundary fitting in a visible spectrum.

C8. The method of paragraph C1, wherein detecting the presence or absence of the leak detection medium on the side of the boundary fitting that is opposite the sleeve member comprises detecting the presence of the leak detection medium flowing through the boundary fitting in a liquid form.

C9. The method of paragraph C1, wherein pressurizing the sleeve member comprises pressurizing the sleeve member to a pressure of greater than about 0 psi to about 12 psi.

C10. The method of paragraph C9, wherein pressurizing the sleeve member comprises pressurizing the sleeve member to a pressure greater than about 0 psi to about 2 psi.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 8, referred to above, the blocks may represent operations and/or portions thereof and lines connecting the various blocks do not imply any particular order or dependency of the operations or portions thereof. Blocks represented by dashed lines, if any, indicate alternative operations and/or portions thereof. Dashed lines, if any, connecting the various blocks represent alternative dependencies of the operations or portions thereof. It will be understood that not all dependencies among the various disclosed operations are necessarily represented. FIG. 8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A leak test apparatus comprising:
a sleeve member having a first end and a second end and being configured to surround a portion of a transmission medium;
a first retaining device configured to couple the first end of the sleeve member to a boundary fitting to which the transmission medium is coupled;
a fluid flow restrictor that is separate and distinct from the sleeve member, the fluid flow restrictor is disposed adjacent the second end of the sleeve member and configured to couple with the transmission medium to at least restrict leak detection medium egress from the second end of the sleeve member;
a leak detection medium fluid supply conduit extending through the fluid flow restrictor in parallel with the transmission medium so that the fluid flow restrictor is common to both the transmission medium and the leak detection medium fluid supply conduit; and
wherein the sleeve member is coupled to both the boundary fitting and the fluid flow restrictor and configured to contain a leak detection medium and effect a pressurization of the boundary fitting with the leak detection medium.

2. The leak test apparatus of claim 1, wherein the leak detection medium fluid supply conduit is integral to the fluid flow restrictor.

3. The leak test apparatus of claim 1, further comprising a second retaining device configured to couple the fluid flow restrictor to both the sleeve member and the transmission medium so that the sleeve member forms a pressure vessel between the boundary fitting and the fluid flow restrictor.

4. The leak test apparatus of claim 1, further comprising a leak detection medium supply configured to couple with the leak detection medium fluid supply conduit to effect pressurization of the sleeve member.

5. The leak test apparatus of claim 1, wherein the sleeve member comprises a substantially rigid conduit.

6. The leak test apparatus of claim 1, wherein the sleeve member comprises a substantially flexible conduit.

7. The leak test apparatus of claim 1, wherein the sleeve member comprises:
a body having a longitudinal axis extending between the first end and the second end;
longitudinally extending edges of the body that extend along the longitudinal axis and form a seam through which the transmission medium is inserted into the sleeve member; and
a seal extending along the seam and being configured to couple the longitudinally extending edges.

8. The leak test apparatus of claim 7, wherein the seal comprises a fluid-tight zipper.

9. The leak test apparatus of claim 8, wherein the fluid-tight zipper is coupled to the body with a frangible coupling.

10. A leak test apparatus comprising:
a pressure vessel having a first end and a second end longitudinally spaced from the first end, the pressure vessel including
a sleeve member configured to surround a portion of a transmission medium and a leak detection medium fluid supply conduit,
a fluid flow restrictor configured to couple the sleeve member to both the transmission medium and the leak detection medium fluid supply conduit adjacent the second end, and
a first retaining device configured to couple the first end of the sleeve member to a boundary fitting to which the transmission medium is coupled; and
wherein the pressure vessel is configured to contain a leak detection medium received from the leak detection medium fluid supply conduit and effect a pressurization of the boundary fitting with the leak detection medium.

11. The leak test apparatus of claim 10, further comprising a second retaining device configured to couple the sleeve member to the fluid flow restrictor.

12. The leak test apparatus of claim 10, wherein the leak detection medium comprises one or more of liquid and a gas.

13. The leak test apparatus of claim 10, further comprising a leak detection medium supply configured to couple with the leak detection medium fluid supply conduit and pressurize the sleeve member.

14. The leak test apparatus of claim 13, wherein the leak detection medium supply comprises a pressurized fluid source.

15. A method for leak testing a boundary fitting, the method comprising:
coupling a first end of a sleeve member to a boundary fitting with a first retaining device so that the sleeve member surrounds a portion of a transmission medium coupled to the boundary fitting;
coupling a fluid flow restrictor to the transmission medium;
pressurizing the sleeve member with a leak detection medium introduced within the sleeve member through a leak detection medium fluid supply conduit that extends through the fluid flow restrictor, the fluid flow restrictor being separate and distinct from the sleeve member and disposed adjacent the second end of the sleeve member so that the fluid flow restrictor couples with the transmission medium, the leak detection medium fluid supply conduit, and the sleeve member to at least restrict leak detection medium egress from the second end of the sleeve member; and
detecting a presence or absence of the leak detection medium on a side of the boundary fitting that is opposite the sleeve member.

16. The method of claim 15, further comprising coupling a second end of the sleeve member to the fluid flow restrictor with a second retaining device.

17. The method of claim 15, wherein detecting the presence or absence of the leak detection medium on the side of the boundary fitting that is opposite the sleeve member comprises:
applying a liquid soap solution to the side of the boundary fitting that is opposite the sleeve member; and detecting a presence of bubbles formed by an interaction between the liquid soap solution and the leak detection medium.

18. The method of claim 15, wherein detecting the presence or absence of the leak detection medium on the side of the boundary fitting that is opposite the sleeve member comprises detecting the presence of the leak detection medium flowing through the boundary fitting in an infrared spectrum.

19. The method of claim 15, wherein detecting the presence or absence of the leak detection medium on the side of the boundary fitting that is opposite the sleeve member comprises detecting the presence of the leak detection medium flowing through the boundary fitting in a visible spectrum.

20. The method of claim 15, wherein detecting the presence or absence of the leak detection medium on the side of the boundary fitting that is opposite the sleeve member comprises detecting the presence of the leak detection medium flowing through the boundary fitting in a liquid form.

* * * * *